US012743545B2

(12) United States Patent
Ravindranath et al.

(10) Patent No.: US 12,743,545 B2
(45) Date of Patent: Sep. 22, 2026

(54) DATA COLLECTION ANALYSIS FOR PRIVACY RISK ASSESSMENT

(71) Applicant: Google LLC, Mountain View, CA (US)

(72) Inventors: Radhika Ravindranath, South Plainfield, NJ (US); James Paul Black, Sunnyvale, CA (US); Dev Narendrabhai Patel, Gujarat (IN)

(73) Assignee: Google LLC, Mountain View, CA (US)

( * ) Notice: Subject to any disclaimer, the term of this patent is extended or adjusted under 35 U.S.C. 154(b) by 48 days.

(21) Appl. No.: 18/501,764

(22) Filed: Nov. 3, 2023

(65) Prior Publication Data

US 2025/0148122 A1 May 8, 2025

(51) Int. Cl.
*G06F 21/62* (2013.01)
*G06F 21/60* (2013.01)

(52) U.S. Cl.
CPC ........ *G06F 21/6245* (2013.01); *G06F 21/604* (2013.01)

(58) Field of Classification Search
None
See application file for complete search history.

(56) References Cited

U.S. PATENT DOCUMENTS 8,925,099 B1 * 12/2014 Saxe .................. G06F 21/6245 713/187
9,294,912 B1 * 3/2016 Flowerday ............. G06F 21/62
10,747,897 B2 * 8/2020 Cook .................. G06F 21/6245
11,238,169 B2 * 2/2022 Daftary ............... G06F 21/6245
11,641,369 B1 * 5/2023 Anturkar ............. H04L 63/0421 726/23
2010/0114839 A1 * 5/2010 Krishnamurthy ... H04L 63/0428 707/E17.108
2013/0185804 A1 * 7/2013 Biswas ................. G06F 21/577 726/26
2013/0298248 A1 * 11/2013 Boldrev .............. G06F 21/6245 726/26
2015/0235050 A1 * 8/2015 Wouhaybi ............ G06F 16/955 726/28
2016/0173521 A1 * 6/2016 Yampolskiy ..... G06Q 10/06393 726/25
2017/0068827 A1 * 3/2017 Sachs ................. G06Q 30/0277

(Continued)

OTHER PUBLICATIONS

Raschke, Philip et al., “Designing a GDPR-compliant and Usable Privacy Dashboard”, 12th IFIP WG 9.2, 9.5, 9.6/11.7, 11.6/SIG 9.2.2 International Summer School, Ispra, Italy, Sep. 4-8, 2017, 17 pages. (Year: 2017).*

(Continued)

*Primary Examiner* — Michael Pyzocha
(74) *Attorney, Agent, or Firm* — Lowenstein Sandler LLP

(57) ABSTRACT

A method includes identifying, by a processing device, a third-party service provider of a plurality of third-party service providers that is authorized by a user to access data associated with the user. A data privacy score is generated based on one or more privacy risk factors. The data privacy score is associated with the third-party service provider. The data privacy score is indicative of a level of protection and privacy the third-party service provider maintains with respect to the data. A user interface (UI) displaying at least the data privacy score associated with the third-party service provider is provided for presentation on a client device associated with the user.

20 Claims, 5 Drawing Sheets

(56) References Cited

U.S. PATENT DOCUMENTS

| | | | | |
|---|---|---|---|---|
| 2017/0300647 | A1* | 10/2017 | Goldberg | G16H 20/10 |
| 2018/0219917 | A1* | 8/2018 | Chiang | H04L 63/1433 |
| 2020/0202037 | A1* | 6/2020 | Parkinson | H04W 12/02 |
| 2020/0302087 | A1* | 9/2020 | Parkinson | G06Q 10/107 |
| 2020/0387624 | A1* | 12/2020 | Dunjic | G06F 21/604 |
| 2021/0042428 | A1* | 2/2021 | Daftary | G06F 21/6245 |
| 2021/0350488 | A1* | 11/2021 | Hossain | G06F 21/604 |
| 2021/0374238 | A1* | 12/2021 | Leung | G06F 21/552 |
| 2022/0156657 | A1* | 5/2022 | Brannon | G06Q 10/067 |
| 2022/0179978 | A1* | 6/2022 | Stroila | G06F 21/6245 |
| 2022/0198044 | A1* | 6/2022 | Madhavan | G06Q 50/265 |
| 2022/0400162 | A1* | 12/2022 | Hu | G06N 20/20 |
| 2023/0020523 | A1* | 1/2023 | Kulkarni | G06F 21/6218 |
| 2023/0067728 | A1* | 3/2023 | VanLoo | H04L 63/20 |
| 2023/0141627 | A1* | 5/2023 | Bao | G06F 21/552 705/44 |
| 2023/0222137 | A1* | 7/2023 | Aucinas | G06F 16/252 707/802 |
| 2023/0385430 | A1* | 11/2023 | Padval | G06F 21/577 |
| 2024/0005034 | A1* | 1/2024 | Raju | G06F 21/6245 |
| 2024/0070314 | A1* | 2/2024 | Singh | G06F 21/6245 |
| 2024/0184906 | A1* | 6/2024 | Taylor | G06F 21/6218 |
| 2024/0394412 | A1* | 11/2024 | Shin | G06F 21/6245 |
| 2025/0077714 | A1* | 3/2025 | Jalil | G06N 3/0475 |

OTHER PUBLICATIONS

Bonne, Bram et al., “The Privacy API: Facilitating Insights in How One’s Own User Data is Shared”, 2017 IEEE European Symposium on Security and Privacy Workshops (EuroS&PW), pp. 72-75. (Year: 2017).*

* cited by examiner

DATA COLLECTION ANALYSIS FOR PRIVACY RISK ASSESSMENT

TECHNICAL FIELD

The disclosed implementations relate generally to data privacy tools. More particularly, the disclosed implementations relate to methods, systems, graphical user interfaces, and data structures for data collection analysis for privacy risk assessment.

BACKGROUND

Data privacy tools provide software solutions designed to protect and manage the privacy of sensitive information for individuals and organizations.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

An aspect of the disclosure provides a system and a computer-implemented method that includes data collection analysis for privacy risk assessment. In an implementation, the method includes identifying a third-party service provider or multiple third-party service providers that is authorized by a user to access data associated with the user. The method further includes determining a data privacy score based on one or more privacy risk factors. The method further includes associating the data privacy score with the third-party service provider. The data privacy score is indicative of a level of protection and privacy the third-party service provider maintains with respect to the data. The method further includes providing, for presentation on a client device associated with the user, a user interface (UI) displaying at least the data privacy score associated with the third-party service provider. In some embodiments, the UI further displays information to request revocation of authorization of the plurality of third-party service providers to access the data associated with the user.

In some embodiments, the one or more privacy risk factors include one or more of data protection analysis, legal document analysis, third-party service provider notices, an allowlist, a denylist, application programming interface (API) analysis, application log analysis, user privacy preferences, or threat intelligence analysis.

In some embodiments, the method further includes determining that the data privacy score associated with the third-party service provider is lower than a threshold data privacy score, and providing an indication for the user to cease sharing the data with the third-party service provider. In some embodiments, the method further includes determining data privacy scores for each of the other third-party service providers of the plurality of third-party service providers, and combining the data privacy scores of the plurality of third-party service providers to determine an overall data privacy score associated with the user.

In some embodiments, to determine the data privacy score based on one or more privacy risk factors, the method further includes providing documentation associated with the third-party service provider as input to a machine learning model. The machine learning model is trained to predict, based on a given textual input, data privacy policies associated with the given textual input. The method further includes obtaining outputs from the machine learning model. The outputs indicate one or more passages within the documentation associated with the data privacy policies of the third-party service provider. The method further includes analyzing the one or more passages to determine the data privacy score.

In some embodiments, the method further includes modifying the data privacy score responsive to determining that terms and conditions governing sharing of data between the user and the third-party service provider have expired. In some embodiments, the method further includes determining that the data associated with the user has been compromised in a privacy breach. The method further includes transmitting a notification to the client device associated with the user, wherein the notification indicates that the data associated with the user has been compromised.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
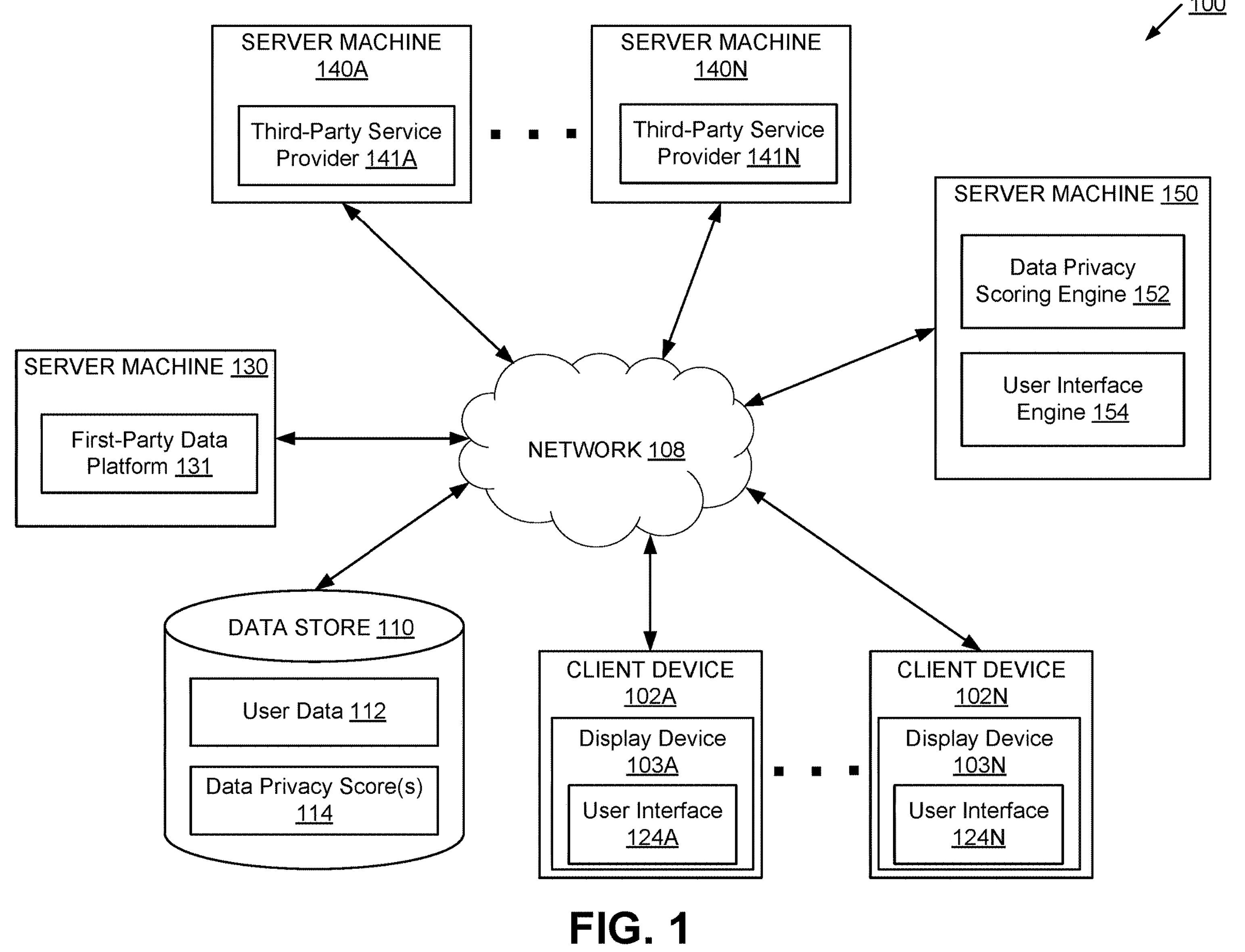
FIG. 1 illustrates an example of system architecture for enabling data collection analysis for privacy risk assessment, in accordance with at least one embodiment of the present disclosure.

In an increasingly interconnected world, the collection, processing, and dissemination of personal and/or sensitive information permeates organizations. Individuals often share their data with many entities that use the individuals' data to provide a host of services for the individuals. For example, individuals may share their data across different third-party service providers and platforms such as social media platforms, online retailers, email services, utility companies, healthcare providers, and the like. As a result, data privacy has become an important concern for many individuals. Data is stored, shared, and analyzed across a range of digital platforms, creating both opportunities and risks. For example, security breaches can lead to unauthorized access to personal data associated with an individual and may pose various risks to the individual. Exposure of personal data can lead to identity theft, financial loss, fraudulent activities, reputation damage. Personal data can include personally identifiable information (PII), sensitive personally identifiable information (SPII), or non-PII data about the data subject. For example, sensitive personal data can include names, birthdays, phone numbers, financial information (credit card numbers, bank numbers, etc.), biometric data (fingerprints, iris scans, facial recognition data, etc.), internet protocol (IP) addresses, home addresses, social security numbers, and the like. Due to the sensitive nature of such information, it is important that individuals (also referred to as "data subjects" herein) that share their information with third-party service providers are informed on data privacy practices associated with the third-party services they share their data with.

In some instances, third-party service providers take measures to inform their users about how their users' data is collected, used, stored, and shared. For example, third-party service providers may maintain privacy policies and terms of service (ToS) that outline how the service provider collects, uses, and shares user data as well as disclaimers and limitations of liability. Third-party service providers may use in-application notifications or on-site banners to inform users about updates to privacy policies or ToS. The notifications typically prompt users to review and accept any changes. However, users may fail to pay attention to notifications or hurriedly dismiss privacy notifications as these notifications may be perceived as an intrusion on the user experience with the application, a problem that can be exacerbated when a user is rushed to perform a task using the application. Some third-party service providers may offer user dashboards or other user interfaces (UI) for users to manage their privacy preferences and data sharing. However, user data may traverse a complex network involving numerous third-party services to evaluate their privacy posture (e.g., how their data is distributed and utilized across multiple providers). It can be challenging for users to keep track of how their data is shared across various platforms, especially when using multiple applications, websites, and online services. Additionally, some third-party service providers may fail to provide transparent information regarding their data-sharing practices. Accordingly, individuals that share their data may not have easy access to details about which third-party service providers receive their data, for what purpose, and how the data is utilized and shared with other entities. As a result, data associated with the individuals may be fragmented across many different service providers, making it difficult for users to understand their privacy posture.

Aspects and implementations of the present disclosure address the above and other deficiencies by providing systems and methods for data collection analysis for privacy risk assessment. A first-party host system can continuously and/or periodically generate data privacy scores associated with third-party service providers that a user shares their data with. A low data privacy score associated with a third-party service provider may indicate that the user's data shared with the third-party service is likely to be or already has been compromised, misused, or exposed as a result of sharing their data with the third-party service. A high data privacy score associated with a third party service may indicate that the user's data shared with the third-party service is not likely to be or have been compromised, misused, or exposed by the third-party service. A data privacy score can be determined based on one or more privacy risk factors. For example, privacy risk factors may generally include how the third-party service provider shares user data with other third-parties and what data is shared with the third-party service provider. Specifically, privacy risk factors can include data handling practices, data elements requested by the third-party, legal document analysis to determine third-party data protection policies, expiration status of terms and conditions, Application Programming Interface (API) and application log analysis, user privacy settings, existing user allowlists (e.g., whitelists) and denylists (e.g., blacklists), and threat intelligence analysis.

Using legal document analysis as an example, this privacy risk factor can be an indicator of a third party service provider's data protection and sharing policies. In some embodiments, the system may identify various legal documentation associated with the third-party service provider, such as the provider's privacy policy, ToS, data processing agreements, and data sharing agreements. For example, ToS documentation associated with the third party service provider may be provided as input to a machine learning model (MLM) such as a natural language (NLP) machine learning model. The MLM may be trained to predict, based on textual input, data privacy policy associated with the textual input. The MLM may be trained to extract and analyze specific information from the ToS documentation such as types of data collected from the user and for what purpose, security measures the provider has in place to protect data, information outlining data sharing with other third parties, commitments to complying with relevant data protection regulations (e.g., General Data Protection Regulation (GDPR), California Consumer Privacy Act (CCPA), etc.), data retention policies and the like. Additionally, the MLM may be trained to recognize textual passages related to the third party platform's policy with respect to data sharing with other third parties and determine whether the policy presents a privacy risk. For example, a third-party service provider may include a clause in their ToS stating that the user consents to allowing the provider to share the user's data with any of their partners for any purpose. The MLM may identify the clause in the ToS and determine that the policy provides inadequate protection of the user's data. As a result, the data privacy score associated with the third-party service provider may be decreased.

It is appreciated that privacy risk factors related to legal document analysis are used as an example of a privacy risk factor by way of example, and not by way of limitation. Other or additional privacy risk factors may be utilized with respect to the disclosed technique, as described in detail below.

In some embodiments, the system can provide, for presentation on a client device associated with the user, a user interface (UI) displaying information related to their privacy posture with respect to third-party services they share their data with. For example, the UI may display a data privacy score associated with a particular third-party service provider. In some embodiments, the UI may display an indication whether the user should continue sharing their data with the particular third-party service provider. For example, in response to determining that the data privacy score associated with the particular third-party service provider is lower than a threshold data privacy score, the system may indicate that the user should cease sharing their data with the particular third-party service provider.

In some embodiments, the system may determine data privacy scores for each third-party service provider the user shares their data with and combine/aggregate (e.g., average) each of the data privacy scores to determine an overall data privacy score associated with the user. The overall data privacy score may provide an indication of the user's overall privacy posture with respect to the totality of third-party service providers with access to user data. In some embodiments, the overall data privacy score may be displayed within the UI on the client device associated with the user.

Aspects of the present disclosure provide technical advantages over the previous solutions. Aspects of the present disclosure may improve data security and privacy by providing systems and methods that generate data privacy scores that enable a user to understand how their data is being collected, shared, and used across multiple third-party service providers. Such features can provide a system and UI that simplifies the process of monitoring third-party data privacy practices and data protection obligations to give users greater control over their personal data. This allows users to monitor their overall privacy posture (as indicated by calculated data privacy scores) without navigating multiple third-party platforms to determine how their data is being shared and utilized, thereby resulting in more efficient use of computing resources and avoiding consumption of computing resources otherwise required to achieve the above navigation and other operations associated with conventional data protection techniques.

FIG. 1 is an example of a system architecture 100 (generally referred to as "system 100" herein) for enabling data collection analysis for privacy risk assessment, in accordance with at least one embodiment of the present disclosure. The system 100 includes client devices 102A through 102N (referred to generally as "client devices 102" herein), a data store 110, a server machine 130, server machines 140A through 140N (refereed to generally as "server machines 140" herein), and server machine 150 connected via a network 108. The network 108 may include a public network (e.g., the Internet), a private network (e.g., a local area network (LAN) or wide area network (WAN)), or a combination thereof.

In implementations, network 108 may include a wireless infrastructure, which can be provided by one or more wireless communications systems, such as a wireless fidelity (Wi-Fi) hotspot connected with the network 108 or a wireless carrier system that can be implemented using various data processing equipment, communication towers, etc. Additionally or alternatively, network 108 can include a wired infrastructure (e.g., Ethernet).

In some implementations, data store 110 is a persistent storage that is capable of storing data as well as data structures to tag, organize, and index the data. In some embodiments, the data store 110 is a database with associated data structures, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments, data store 110 can be some other type of persistent storage such as an object-oriented database, a relational database, a non-relational database, and so forth, that can be hosted by one or more different machines (e.g., the server machine 130) via network 108. In some implementations, data store 110 can be a distributed database in which data is stored across multiple interconnected locations, while in other embodiments, data store 110 can be a centralize database in which data is stored in a single location.

In some implementations, the data store 110 includes user data 112 and data privacy scores 114. The user data 112 can be data associated with a user (also referred to as "data subject" here) of the system 100. In some embodiments, the data 112 can include personal data associated with a data subject. For example, the data 112 can include personally identifiable information (PII) and/or sensitive personally identifiable information (SPII) that can be used to identify the data subject either on its own or in combination with other data. Examples of PII can include, but is not limited to, full name, date of birth, social security number, driver's license number, home address, email address, phone number, financial account numbers, medical information, biometric data, internet protocol (IP) address, and the like. In some embodiments, data 112 can be non-PII personal data associated with the data subject. In some embodiments, data 112 can be associated with a particular user and stored within a data store 110 dedicated to the particular data subject, such that data 112 collected and processed by third-party entities (e.g., server machines 140) can be stored with the data store 110 and managed by a first-party data platform 151. In some embodiments, data store 110 can include data privacy scores 114 determined by data privacy scoring engine 152 for each third-party service provider 141A through 141N that the user shares their data with, as described in detail below.

The server machine 130 may include a first-party data platform 131. The first-party data platform 131 can collect, store, and manage user data 112. In some embodiments, first-party data platform 131 may facilitate the collection of data directly from users through various touchpoints such as websites, applications, and the like. In some embodiments, the first-party data platform 131 may provide the data store 110 for organizing and storing user data 112. In some embodiments, a user can authorize (e.g., via a client device 102) the first-party data platform 131 to share user data 112 with one or more third-party service providers 141A through 141N. The first-party data platform 131 can facilitate data requests and exchanges associated with the user data 112.

The server machines 140A through 140N respectively include third-party service providers 141A through 141N (referred to generally as "third-party service provider(s) 141" herein). A third-party service provider 141 can refer to a service provided by an entity or organization that is not directly involved with data privacy and management services associated with server machine 130 and 150. Third-party service providers 141 can include any entity or organization that seeks permission to access user data 112 for any purpose, such as a set of services. In some instances, the data 112 can be requested in relation to online services, applications, or platforms that utilize data 112 to provide a specific functionality. For example, third-party service providers 141 can include social media applications, email applications, health and fitness applications, cloud storage services, financial applications, and the like. In some embodiments, a third-party service provider 141 may obtain user data 112 through the first-party data platform 131 (or directly from the user) and store the user data 112 on an associated server machine 140.

The server machine 150 may include a data privacy scoring engine 152 and a user interface (UI) engine 154. The data privacy scoring engine 152 can compute data privacy scores 114 associated with third-party service providers 141 that the user shares user data 112 with. The data privacy scoring engine 152 may compute data privacy scores 114 using multiple components that analyze one or more privacy risk factors, as described in detail with respect to FIG. 2. Privacy risk factors may generally relate to how third-party service providers 141 share user data 112 with other third-party entities and what portions of user data 112 is shared with the third-party service providers 141. For example, privacy risk factors may include third-party service requirements, privacy policies, expiration status of third-party service terms and conditions, API and application logs, user privacy posture settings, allowlists (whitelists) and denylists (blacklist), threat intelligence data, and the like.

The UI engine 154 may provide a user interface (UI) 124A through 124N (referred to generally as "UI(s) 124 herein) for presentation on one or more client devices 102. For example, the user interface engine 154 can present the UI 124 via a web browser (not shown). Alternatively, the client device 102 may include a local (mobile or desktop) application (not shown) that provides UI 124 and communicates with the data privacy scoring engine 152, UI engine 154, and/or the first-party data platform 131 via network 108. In some implementations, a client application (e.g., mobile application, desktop application, browser application, etc.) can provide, for presentation on a display device 103A-103N, the UI 124 for users to interact with. The UI 124 may serve as a front-end through which users interact with to view data privacy scores 114, alerts (e.g., privacy incident alerts, legal policy change alerts, etc.), suggested user actions, privacy risk monitoring dashboards, resources to request revocation or data deletion from third-party service providers 141, and UI elements that show how user data 112 is being shared and used across third-party service providers 141.

In some implementations, server machines 130, 140, and 150 may operate on one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to access data store 110. In some implementations, the functions of server machines 130, 140, and/or 150 may be provided by a fewer number of machines. For example, in some implementations, components and/or modules of any of server machines 130-150 can be integrated into a single machine, while in other implementations components and/or modules of any of server machines 130-150 can be integrated into multiple machines. In general, functions described in implementations as being performed by any of server machines 130-150 can also be performed on the client devices 102A-N in other implementations. In addition, the functionality attributed to a particular component can be performed by different or multiple components operating together.

The client devices 102A-102N can include one or more processing devices communicatively coupled to memory devices and I/O devices. The client devices 102A-102N can be desktop computers, laptop computers, tablet computers, mobile phones (e.g., smartphones), or any suitable computing device. The client device 102A-102N can include components, such as an input device and an output device. A user can be authenticated by the server machine 130 and/or server machine 150 using a username and password (or other identification information) provided by a user via the user interface 124A-124N, such that the same client device 102A-102N can be used by different users at different times.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
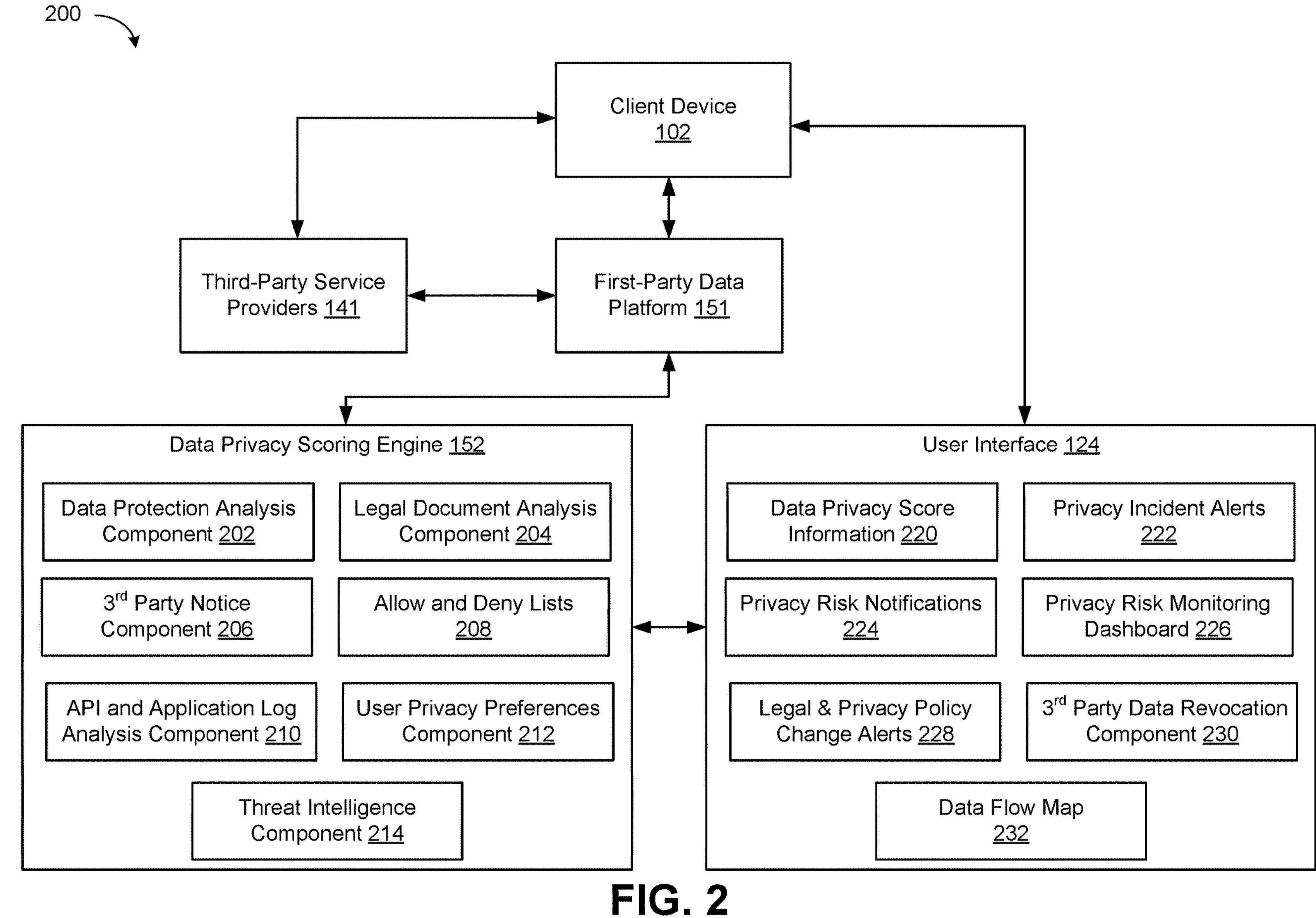
FIG. 2 is a block diagram illustrating components of an example data privacy scoring engine and user interface (UI), in accordance with at least one embodiment of the present disclosure.

FIG. 2 is a block diagram 200 illustrating components of an example data privacy scoring engine 152 and user interface (UI) 124, in accordance with at least one embodiment of the present disclosure. Data privacy scoring engine 152 can be connected (e.g., via network 108) to a first-party data platform 151. First-party data platform 151 can additionally be connected (e.g., via network 108) to one or more client devices 102 (e.g., client devices 102A-102N, etc.). A user associated with the client device 102 can authorize the first-party data platform 151 to share their data with one or more third-party service providers 141 (e.g., third-party service providers 141A-141N). Accordingly, user data can be requested and exchanged (e.g., over network 108) between one or more third-party service providers 141 and the first-party data platform 151. In some embodiments, first-party data platform can be connected to a memory (e.g., via a network 108, via a bus, etc.) to store user data (e.g., user data 112). In some embodiments, one or more portions of the memory can correspond to data store 110. In some embodiments, one or more portions of the memory can additionally or alternatively correspond to a memory of client device 102 and/or another memory associated with system 100.

As indicated above, the data privacy scoring engine 152 can compute data privacy scores (e.g., data privacy scores 114) associated with third-party service providers 141 that the user shares their data with. In some embodiments, the data privacy scoring engine 152 can include a data protection analysis component 202, a legal document analysis component 204, a third-party notice component 206, allow and deny lists 208, an API and application log analysis component 210, a user privacy preferences component 212, and a threat intelligence component 214.

The data protection analysis component 202 of data privacy scoring engine 152 can analyze data elements requested by a third-party service provider 141. Specifically, the data protection analysis component 202 can analyze third-party service provider 141 service requirements and/or data handling practices related to data collection, processing, and use. Such analysis may be a privacy risk factor that determines or influences a data privacy score associated with the third-party service provider 141.

In some embodiments, the data protection analysis component 202 can analyze third-party service provider 141 sharing user data with other external entities (e.g., other third-parties) based on a geographical location or region of the user. This can include a third-party service provider 141 service requirement that allows the third-party service provider 141 to provide information regarding the users' locations (e.g., country, city, specific coordinates, etc.) with other parties such as advertisers and partners. In some embodiments, the data protection analysis component 202 can analyze notice, consent, and control requirements associated with the third-party. The notice requirement can include whether the third-party service provider 141 is obligated to inform individuals about how their data is collected, processed, and used. The consent requirement can include whether the third-party service provider 141 is required to obtain explicit consent from individuals before collecting, processing, or otherwise using their data. The control requirement can include whether a user has a right to access their data, correct inaccuracies, restrict processing, request deletion, and otherwise exert control over their data retained by the third-party service provider 141. In some embodiments, the data protection analysis component 202 can analyze retention and deletion policies associated with the third-party service provider 141. Data retention and deletion policies can include a set of rules established by the third-party service provider 141 that specify how long user data is to be retained by the third-party service provider 141 and when user data is to be deleted.

In some embodiments, each of the above-described data handling practices and/or service requirements can be bucketed into a predefined list of options corresponding to existing data handling practices and service requirements deemed acceptable or unacceptable from a privacy perspective. In some embodiments, acceptable and unacceptable data handling practices and service requirements can be defined by a user (e.g., via a client device) or by a developer according to practices that are generally considered acceptable (e.g., as outlined by one or more regulations such as the General Data Protection Regulation (GDPR), California Consumer Privacy Act (CCPA), and other global privacy frameworks). Each option may have its own sub-data privacy score and that contributes to a data privacy score associated with the third-party service 141 analyzed by the data privacy scoring engine 152. In some implementations, an acceptable practice may increase a data privacy score while an unacceptable practice may decrease a data privacy score.

In an illustrative example, sub-data privacy scores and data privacy scores may be represented on a scale of 1 to 100. A first data handling practice associated with the third-party service provider 141 may allow the third-party service provider 141 to retain user data indefinitely. The first data handling practice may be deemed absolutely unacceptable with a defined first sub-data privacy score of zero. A second data handling practice associated with the third-party service provider 141 may outline that the third-party service provider 141 may share user data with advertisers. The second data handling practice may be somewhat unacceptable with a defined second sub-data privacy score of 50. A third data handling practice associated with the third-party service provider 141 may outline that the third-party service provider 141 will not require users' geolocation data. The third data handling practice may be acceptable and defined with a third sub-data privacy score of 100. In some embodiments, the data privacy score associated with the third-party service 141 may be an aggregation of the sub-data privacy scores. For example, the data privacy score may be an average of the first, second, and third sub-data privacy scores. Accordingly, the data privacy score associated with the third-party service provider may be 50 ((0+50+100)/3). It is appreciated that other methods of aggregation may be used herein to calculate data privacy scores, such as including, but not limited to, summations, averages, medians, weighted averages, and the like.

In some embodiments, the predefined list of options corresponding to existing data handling practices and service requirements can be updated dynamically (e.g., in real-time) based on resource-specific options associated with each data handling practice/service requirement in the list. For example, a first item of list may correspond to a current geolocation service requirement associated with the third-party service provider 141. Responsive to a determination that the third-party service provider 141 has change its geolocation service requirement, the predefined list of options may be updated (e.g., in real-time) and the risk score associated with the third-party service provider 141 may recalculated to reflect the new geolocation service requirement.

The legal document analysis component 204 of data privacy scoring engine 152 can use natural language processing and other techniques to analyze legal documentation and identify data protection, use, and sharing policies (e.g., privacy and security policies, certificates, and standards) associated with a third-party service-provider. Such analysis may be a privacy risk factor that determines or influences a data privacy score associated with the third-party service provider 141.

In an illustrative example, the data protection analysis component 202 can leverage machine learning and deep learning techniques to understand and interpret legal documents and extract relevant information associated with data handling practices contained with input documentation. An NLP model can be trained to identify and/or extract sentences or paragraphs containing information related to data handling practices. In some embodiments, the NLP model can implement a rule-based system to identify sentences or segments within input documentation that follow a predefined structure indicative of data handling statements. The rules can be designed based on linguistic patterns commonly found in legal documents associated with data handling practices. In some embodiments, labeled data may be used to train a supervised machine learning model to classify sentences, portions of sentences, or paragraphs as being related to data handling practices or not. It is appreciated that the NLP model may include a variety of techniques including rule-based models, statistical models, machine learning models, embedding-based models, recurrent neural networks (RNNs), gated recurrent neural networks (RNNs), transformer models, generative pre-trained transformers (GPTs), and the like.

The legal document analysis component 204 may provide legal documentation as input to the trained NLP model and obtain one or more outputs from the NLP model. The outputs may indicate (e.g., identify or include) one or more passages within the documentation associated with data privacy policies of the third-party service provider 141. For example, the NLP model may identify privacy policies, certifications, and standards associated with the third-party service provider 141. Privacy policies may outline how the third-party service provider 141 collects, uses, manages, and protects user data. Privacy certificates include seals obtained by the third-party service provider to demonstrate commitment to specific privacy standards. For example, privacy certificates may include an international standard on requirements for information security management (ISO 27001) certificate or certificates provided by privacy organizations or industry groups. Standards can include guidelines established by regulatory authorities such as the GDPR. In an illustrative example, an NLP model may determine, based on a legal document provided as input to the NLP model, that the third-party service provider 141 has committed to follow privacy standards established by the GDPR. As a result, the legal document analysis component 204 may increase a data privacy score associated with the third-party service provider 141.

The third-party notice component 206 of data privacy scoring engine 152 can catalog alerts received from third-party service providers 141 that inform user about changes in privacy policies associated with the third-party service providers 141. In some embodiments, the third-party notice component 206 can generate an alert to be displayed within the UI 124 provided for presentation at a client device associated with the user. In some embodiments, the third-party notice component 206 can adjust a data privacy score associated with the third-party service provider 141 based on an expiration status of a related terms and conditions (T&Cs). For example, the third-party notice component 206 can incrementally decrease the data privacy score associated with the third-party service provider 141 when T&Cs associated with the third-party service provider 141 are set to expire, expire, and/or significantly past expiration).

Data privacy scoring engine 152 can include allow and deny lists 208 as defined by the user. An allowlist (e.g., whitelist) includes a list of third-party service providers 141 that the user has indicated are allowed to access one or more portions of their data. A denylist (e.g., blacklist) includes a list of third-party service providers 141 that the user has indicated are prohibited from accessing one or more portions of their data. In some embodiments, the data privacy scoring engine 152 can adjust a data privacy score associated with a third-party service provider 141 based on the existing allow and deny lists 208 defined by the user. For example, responsive to determining that the user has shared their data with a third-party service provider 141A included in an denylist associated with the user, the data privacy scoring engine 152 may significantly decrease a data privacy score associated with the third-party service provider 141A. Responsive to determining that the user has shared their data with a third-party service provider 141B included in a allowlist associated with the user, the data privacy scoring engine 152 may significantly increase a data privacy score associated with the third-party service provider 141B.

Data privacy scoring engine 152 can include an application programming interface (API) and application log analysis component 210 to determine and/or adjust privacy scores associated with third-party service providers 141. Generally, the application programming interface (API) and application log analysis component 210 can determine and catalog third-party APIs the user uses and determine what data is being sent to third-party APIs as well as whether use of the third-party API will put user data at risk.

In some embodiments, the API and application log analysis component 210 can analyze outbound proxies and API calls that require access to personal information. For example, outgoing API calls may go through an outbound proxy. The API and application log analyze component 210 may review logs generated by outbound proxies to understand how user data is being processed and requests and responses can be cataloged. Accordingly, the API and application log analyze component 210 can determine which third-party servers require access to what data and how they are performing.

In some embodiments, the application log analysis component 210 can analyze host application logs and detect third party API calls. The application log analysis component 210 can monitor application logs (e.g., in real-time, on set intervals, etc.) to detect new APIs and information being requested. In some embodiments, the application log analysis component 210 can inspect all API requests as they happen (e.g., live monitoring). Accordingly, new APIs can be detected immediately or almost immediately. In some embodiments, live monitoring can be integrated with an API gateway or as an in-application agent. In some embodiments, the application log analysis component 210 can scan source code (referred to as "code scanning") to identify use of third-party APIs. It appreciated that a one of or a combination of the above-described approaches can be utilized to detect third-party APIs that require access to user data. In some embodiments, the application log analysis component 210 can identify geo-location updates associated with one or more client devices associated with the user and determine third-party APIs that request geo-location updates.

The data privacy scoring engine 152 can further include a user privacy preferences component 212. Privacy preferences can include user privacy settings indicated (e.g., via a client device) by the user. For example, privacy preferences can include the types of user data the user has authorized to be collected and for what purposes, preferences regarding how long their data is stored within third-party servers, opt-in and opt-out choices (e.g., context to receive personalized advertisements, participate in data analytics, etc.), preferences related to location tracking and sharing, data portability, and the like. In some embodiments, the privacy preferences component can track historical user-selected privacy settings and determine actions to be taken based on the historical user privacy settings.

In an illustrative example, a user privacy setting may indicate that a user prefers (or historically preferred) to only share their data with third-party services that retain the data according to a regulatory standard that states data should be kept in an identifiable form for no longer than necessary for purposes for which the data is being processed. However, the user may share their data with a given service provider with a data retention policy that stipulates the service provider may retain user data in a personally identifiable form for up to ten years, regardless of whether the user continues to use services associated with the service provider unless the user requests data deletion. Accordingly, the user privacy preferences component 212 may indicate that the user should request the given service provider delete all data associated with the user and cease using services associated with the given service provider. In some embodiments, the indication may be presented in the user interface 124. In some embodiments, the user privacy preferences component 212 may additionally decrease a data privacy score associated with the given service provider to reflect the user's data retention policy preference.

In some embodiments, the user privacy preference component 212 can suggestion actions the user can take to improve a data privacy score associated with a particular third-party service provider and/or their overall data privacy score (e.g., aggregation of data privacy scores of each service provider with access to user data). For example, the user privacy preference component 212 can provide an indication that disassociating with the given service provider may increase their overall privacy score and overall privacy posture. In some embodiments, such a suggestion can be determined based on comparing data privacy scores associated with each third-party service provider and the degree in which a privacy score associated with the given third-party service provider affects the user's overall privacy score. For example, the user privacy preference component 212 may determine that the privacy score associated with the given third-party service provider is significantly lower than privacy scores associated with other third-party service providers. Accordingly, the user privacy preference component can suggest disassociating with the given third-party service provider may increase the user's overall privacy score. In some embodiments, the privacy preference component 212 can provide suggestions to improve the privacy score associated with the given service provider. In some embodiments, to make such a suggestion, the privacy preference component 212 may analyze privacy risk factors to determine one or more privacy risk factors that are causing a low data privacy score associated with the given third-party service provider. For example, the privacy preference component 212 may determine that the user is needlessly sharing particularly sensitive information (e.g., their social security number) with the third-party service that is causing the third-party service to be associated with a low privacy score. Accordingly, the privacy preference component 212 can indicate that the user can improve the privacy score associated with the given service provider by ceasing to share their social security number with the given service provider. In some embodiments, the indication can be presented within the UI 124 as a notification to the user.

In some embodiments, the user privacy preferences component 212 can track time domain preferences associated with the user. For example, indicate (e.g., a via client device) a privacy preferences that specifies a duration in which the wishes to share their data with one or more third-party service providers. The user privacy preferences component 212 can automatically track the expiration of such time-bound data approvals prompt the user (e.g., via a notification displayed within the UI 124) to review and update their approval to share their data with the one or more third-party service providers.

The data privacy scoring engine 152 may include a threat intelligence component 214. In some embodiments, the threat intelligence component 214 can identify information about recent data breaches, including the types of data compromised and the affected organizations. Threat intelligence component 214 can update data privacy scores based on identified threat intelligence data. For example, the threat intelligence component 214 may determine that a third-party service provider with granted access to user data has been breached and that the user data may have been compromised. The threat intelligence component 214 may update a data privacy score associated with the compromised third-party service provider to reflect the breach.

As described above, a user interface engine (e.g., user interface engine 154) can provide a UI 124 for display on the client device 102. In some embodiments, a user can interact with the UI 124 via one or more peripheral devices (e.g., a keyboard, a touch screen, a mouse, etc.) that is included with or otherwise connected to client device 102. In some embodiments, the UI 124 can include data privacy score information 220, privacy incident alerts 222, a privacy risk notifications 224, a privacy risk monitoring dashboard 226, legal and privacy policy change alerts 228, a third-party data revocation component 230, and a data flow map 232. In some embodiments, each component included in the data privacy scoring engine 152 can determine one or more privacy risk factor associated that may contribute to a data privacy score associated with a third-party service provider 141.

In some embodiments, the UI 124 can display data privacy score information 220. Data privacy score information can include data privacy scores associated with one or more third-party service providers with access to user data. In some embodiments, data privacy score information can include an overall data privacy score that is an aggregation (e.g., summation, average, etc.) of the data privacy scores associated with multiple third-party service providers. Accordingly, the overall data privacy score can provide the user with an indication of their overall privacy posture.

In some embodiments, the UI 124 can display privacy incident alerts 222. Privacy incident alerts 222 can include notifications indicating that a third-party service provider has experienced an incident that involves the potential compromise or unauthorized access to user data. Privacy incident alerts 222 can be detected through various means. For example, such notifications can be received from external sources, such as regulatory bodies, law enforcement agencies, or cybersecurity threat intelligence services. In some embodiments, such notifications can be received from internal sources (e.g., threat intelligence component 214) or other means such as user incident reporting or from the third-party service provider that has been compromised. A notification associated with the privacy incident alerts 222 can be provided for presentation within the UI 124.

In some embodiments, the UI 124 can include privacy risk notifications 224. Privacy risk notifications 224 can be presented to the user based on user privacy preferences (e.g., as identified and analyzed by user privacy preferences components 212) and/or third-party service provider actions (e.g., as determined by one or more components of data privacy scoring engine 152). For example, a threshold data privacy score may be determined based on the user's privacy preferences. If a data privacy score associated with a third-party service provider 141 is lower than the threshold data privacy score, the data privacy score engine 152 may cause a privacy risk notification 224 to be displayed within the UI 124 indicating that the user should take action (e.g., revoke data access privileges) with respect to the third-party service provider 141. Privacy risk can be periodically (e.g., hourly, daily, yearly, etc.) reevaluated based on changing user preferences and/or third-party service provider 141 privacy policy changes. For example, the user privacy preferences component 212 may determine that the user has taken a more risk-averse approach to privacy when compared to historical user settings. The threshold data privacy score and/or data privacy score associated with the third-party service providers may be updated accordingly.

In some embodiments, the user privacy preference component 212 may detect changes in risk and automatically make determinations/changes in accordance with user preferences and historical user settings. As the user adjusts data privacy preferences, the user privacy preference component 212 may dynamically adapt to changes in user behavior. The privacy preference component 212 may identify (e.g., using machine learning or other algorithms) patterns in user interactions with various third-party platforms in different contexts and automatically adjust privacy settings accordingly. For example, if the user consistently adjusts their privacy settings to restrict access to a certain type of data, the user privacy preference component 212 may learn from such historical preferences and automatically restrict access to the certain type of data for future third-party providers the user shares their data with. Such historical preferences may be periodically reevaluated to determine changes in user preferences and automatically adjust user settings based on those changes.

In some embodiments, the UI 124 can include a privacy risk monitoring dashboard 226. The privacy risk monitoring dashboard 226 can include a visual representation of key metrics (e.g., data privacy scores) associated with third-party service providers 141.

In some embodiments, the UI 124 can include legal and privacy policy changes alerts 228. Privacy policy changes alerts 228 can include notifications displayed to the user as a result of privacy policy changes associated with third-party services providers and/or legal policies/regulations that affect data sharing and retention terms. Such changes, for example, can be detected by one or more components of the data privacy scoring engine 152, as described in detail above.

In some embodiments, the UI 124 can include a third-party data revocation component 230. The third-party revocation component can provide the user with resources to request third-party data revocation. For example, the third-party data revocation component 230 can provide the user with links (e.g., uniform resource locators (URLs)) to provide the user with means to request data revocation.

In some embodiments, the UI 124 can include a data flow map 232. The data flow map 232 can be a visual representation that illustrates the sequential flow of user data through various third-party service providers 141. In some embodiments, the data flow map 232 can show how user data is being shared across third-party service providers 141. In some embodiments, the data flow map 232 can provide indications in the data flow map where there have been incidents (e.g., data leaks), and provide resources for remediation activities, such as requesting access revocation or data deletion from the associated third-party service provider 141.

Figure 3:
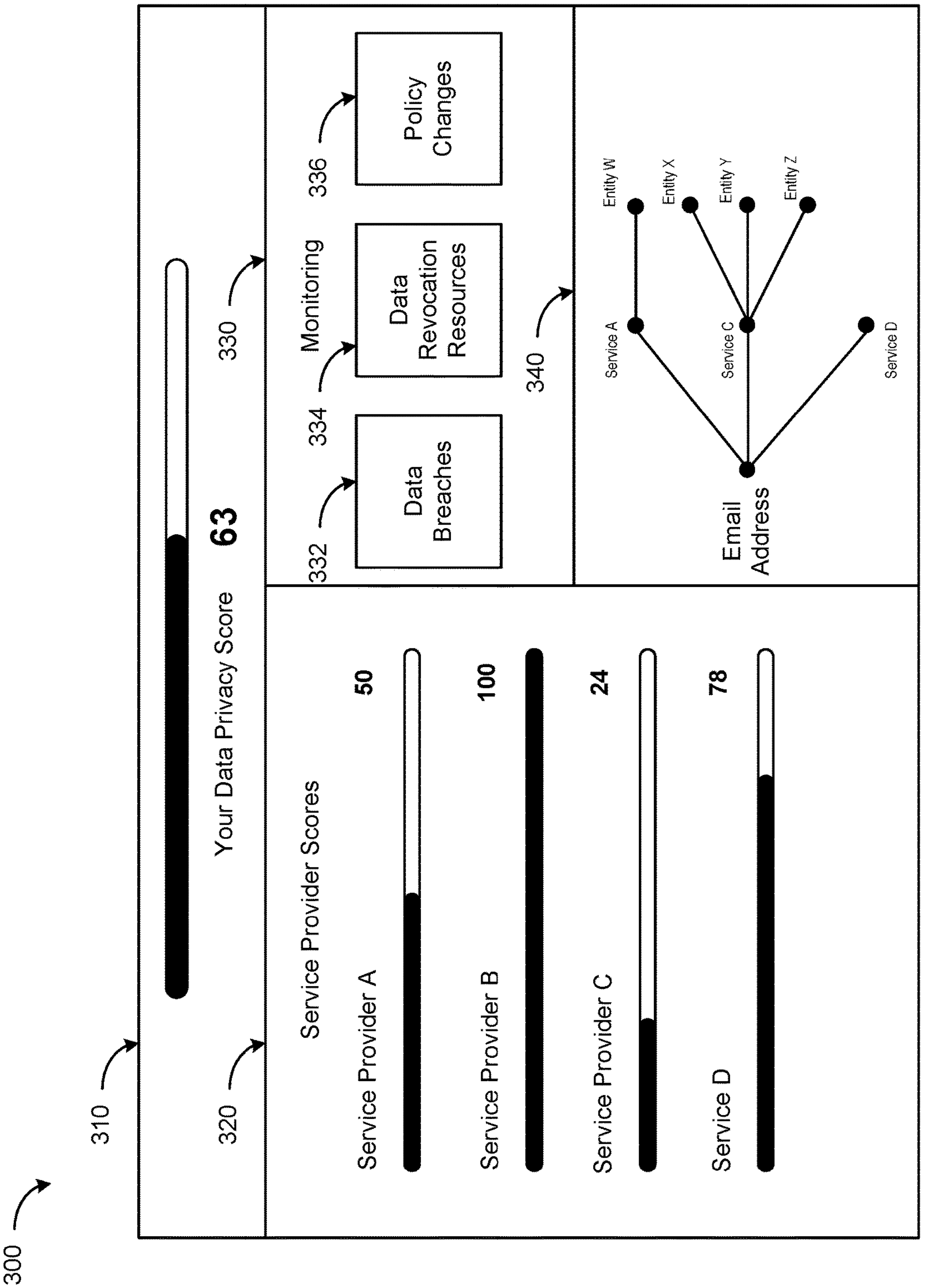
FIG. 3 illustrates an exemplary UI for displaying privacy-related information to a user, in accordance with at least one embodiment of the present disclosure.

FIG. 3 illustrates an exemplary user interface (UI) 300 for displaying privacy-related information to a user, in accordance with at least one embodiment of the present disclosure. In some embodiments, the UI 300 is provided by a UI engine (e.g., UI engine 154) for presentation on a client device (e.g., client device 102). In some embodiments, the UI 300 correspond to UI 124 of FIG. 2. The UI 300 includes a UI element 310, a UI element 320, and a UI element 330. It is appreciated that the UI 300 is presented herein by way of example, and not by way of limitation, noting that the UI 300 can include one or more elements described above with respect to FIG. 2. The UI element 310 can display an overall data privacy score associated with the user. The overall data privacy score can represent an overall privacy posture associated with the user, as described above.

The UI element 320 can display individual privacy scores associated with third-party service providers that have access to user data. For example, the UI element 320 includes a region corresponding to a service provider A, a region corresponding to service provider B, a region corresponding to service provider C, and a region corresponding to service provider D. As illustrated, the data privacy score associated with service provider A is 50, the data privacy score associated with service provider B is 100, the data privacy score associated with service provider C is 24, and the data privacy score associated with service provider D is 78. The overall data privacy score displayed within the UI element 310 is an average of the data privacy scores displayed within the UI element 320.

The UI element 330 can be a monitoring dashboard to display multiple regions corresponding to various privacy-related alerts and resources. For example, the UI element can include a UI element 332, a UI element 334, and a UI element 336. Responsive to a user interaction with the UI element 332, alerts related to data breaches associated with the third-party service providers A-D can be provided for display within the UI 300. Responsive to a user interaction with the UI element 334, data revocation resources associated with the third-party service providers A-D can be provided for presentation within the UI 300. Responsive to a user interaction with UI element 336, privacy policy changes associated with the third-party service providers A-D can be provided for presentation within the UI 300.

The UI element 340 can be a data flow map illustrating, for example, what user data is being shared, with which service providers, and with what other entities the service providers share user data with. As illustrated, the user shares their email address with service provider A, service provider C, and service provider D. Service provider A shares the user's email address with entity W. Service provider C shares the user's email address with entities X, Y, and Z.

Figure 4:
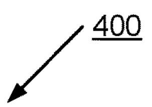
FIG. 4 depicts a flow diagram of a method for data collection analysis for privacy risk assessment, in accordance with at least one embodiment of the present disclosure.
Figure 4:
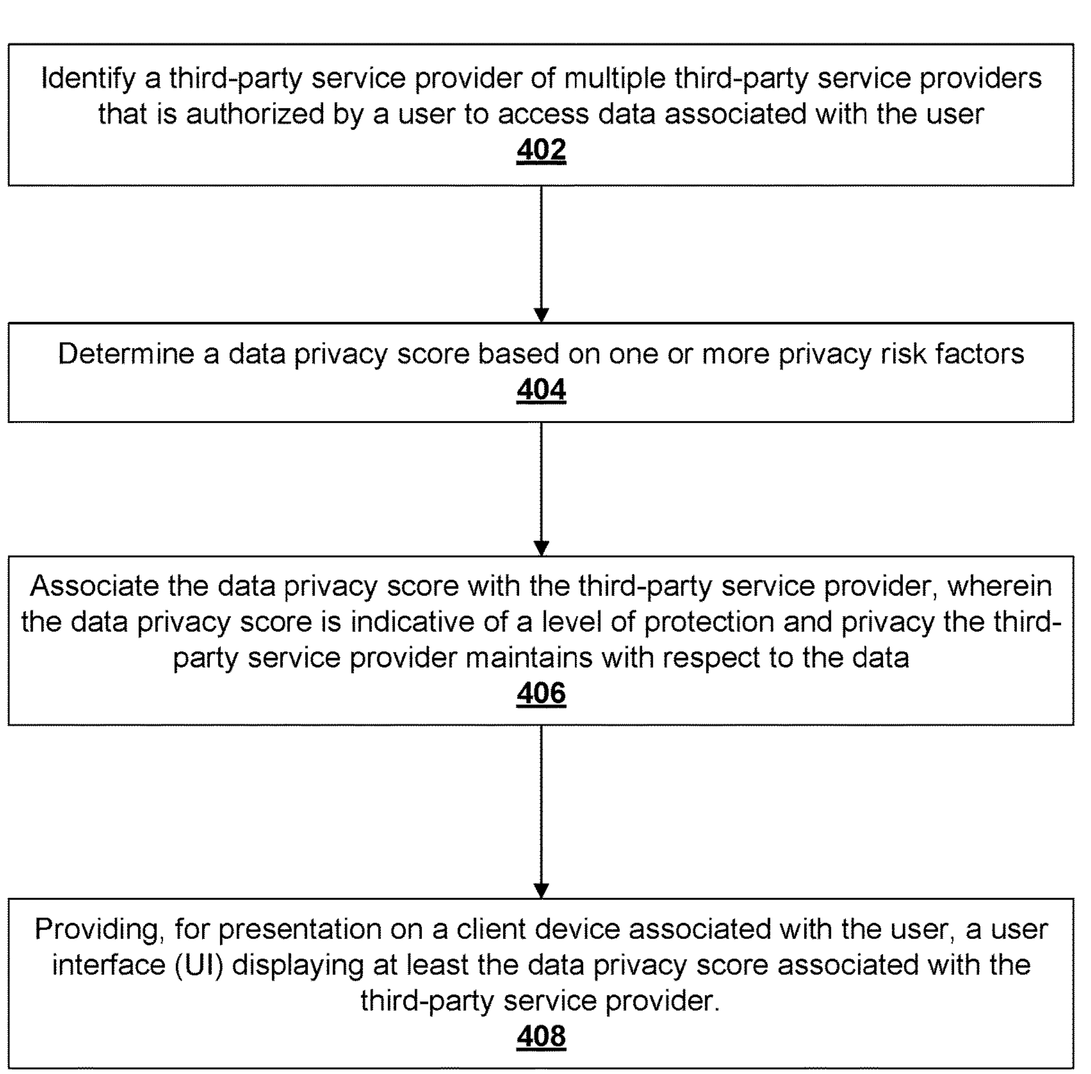

FIG. 4 depicts a flow diagram of a method 400 for data collection analysis for privacy risk assessment, in accordance with at least one embodiment of the present disclosure. Method 400 may be performed by processing logic that may include hardware (circuitry, dedicated logic, etc.), software (e.g., instructions run on a processing device), firmware, and/or a combination thereof. In one implementation, some or all the operations of method 400 may be performed by one or more components of system 100 of FIG. 1 (e.g., server machine 130, server machine 140, scrambling engine 136, etc.).

For simplicity of explanation, the method 400 of this disclosure is depicted and described as a series of acts. However, acts in accordance with this disclosure may occur in various orders and/or concurrently, and with other acts not presented and described herein. Furthermore, not all illustrated acts may be required to implement the method 400 in accordance with the disclosed subject matter. In addition, those skilled in the art will understand and appreciate that the method 400 could alternatively be represented as a series of interrelated states via a state diagram or events. Additionally, it should be appreciated that the method 400 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At operation 402 of method 400, processing logic identifies a third-party service provider (of multiple third-party service providers) authorized by a user to access data associated with the user.

At operation 404 of method 400, the processing logic determines a data privacy score based on one or more privacy risk factors. In some embodiments, the privacy risk factors include data protection analysis, legal document analysis, third-party service provider notices, an allowlist, a denylist, application programming interface (API) analysis, application log analysis, user privacy preferences, and/or threat intelligence analysis. In some embodiments, to determine the data privacy score based on one or more privacy risk factors, the processing logic may provide documentation associated with the third-party service provider as input to a machine learning model (e.g., a natural language processing (NLP) model). The machine learning model is trained to predict, based on a given textual input, data privacy policies associated with the given textual input. The processing logic may obtain outputs from the machine learning model. The outputs can indicate one or more passages within the documentation associated with the data privacy policies of the third-party service provider. The processing logic can analyze the one or more passages to determine the data privacy score.

At operation 406 of method 400, the processing logic associates the data privacy score with the third-party service provider. The data privacy score is indicative of a level of protection and privacy the third-party service provider maintains with respect to the data.

At operation 408 of method 400, the processing logic provides, for presentation on a client device associated with the user, a user interface (UI) displaying at least one of the data privacy score associated with the third-party service provider or an indication of whether the user should continue sharing the data with the third-party service provider. In some embodiments, the UI further displays information to request revocation of authorization of the plurality of third-party service providers to access the data associated with the user.

In some embodiments, the processing logic can determine that the data privacy score associated with the third-party service provider is lower than a threshold data privacy score, and provide an indication to the user that the user should cease sharing the data with the third-party service provider. In some embodiments, the processing logic can determine data privacy scores for each of the other third-party service providers of the plurality of third-party service providers, and combine the data privacy scores of the plurality of third-party service providers to determine an overall data privacy score associated with the user.

In some embodiments, the processing logic may modify the data privacy score responsive to determining that terms and conditions governing sharing of data between the user and the third-party service provider have expired. In some embodiments, the processing logic may determine that the data associated with the user has been compromised in a privacy breach, and transmit a notification to the client device associated with the user. The notification can indicate that the data associated with the user has been compromised.

Figure 5:
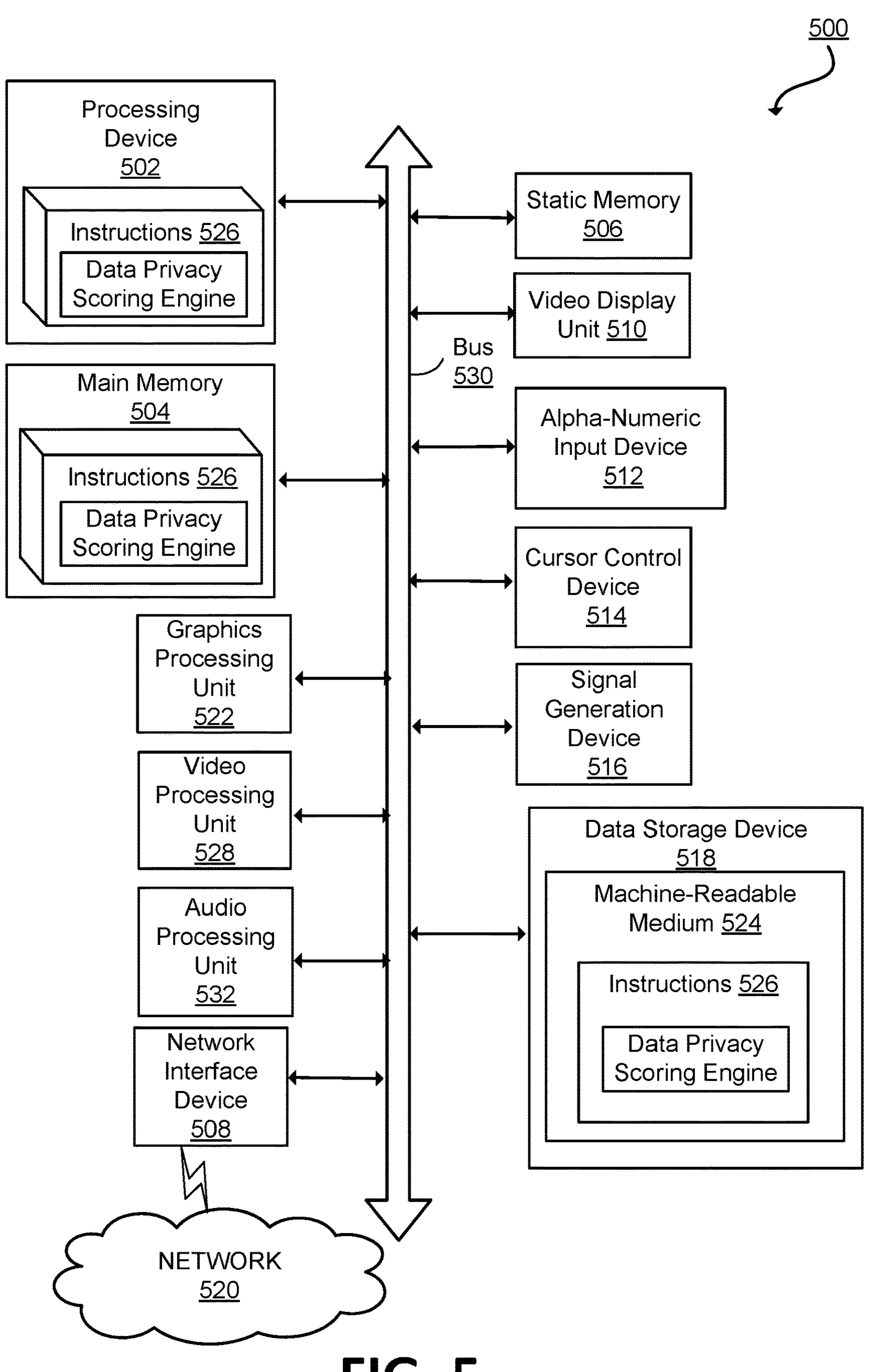
FIG. 5 depicts a block diagram of an example computing device operating in accordance with at least embodiment of the present disclosure.

FIG. 5 illustrates an example machine of a computer system 500 within which a set of instructions, for causing the machine to perform any one or more of the methodologies discussed herein, can be executed, in accordance with aspects and implementations of the present disclosure. The computer system 500 may be server machines 130-150 or client devices 102A-N of FIG. 1. In alternative implementations, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random-access memory (DRAM) such as synchronous DRAM (SDRAM), a static memory 505 (e.g., flash memory, static random-access memory (SRAM), etc.), and a data storage device 518, which communicate with each other via a bus 530.

Processing device 502 represents one or more processors such as a microprocessor, a central processing unit, or the like. More particularly, the processing device can be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 can be configured to execute instructions 526 for performing the operations and steps described herein.

The computer system 500 can further include a network interface device 508 to communicate over the network 520. The computer system 500 also can include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 can include a machine-readable storage medium 524 (also known as a non-transitory computer-readable storage medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine, allowing the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm can be a sequence of operations leading to a desired result. The operations are those requiring physical manipulations of physical quantities. Such quantities can take the form of electrical or magnetic signals capable of being stored, combined, compared, and otherwise manipulated. Such signals can be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems can be used with programs in accordance with the teachings herein, or it can prove convenient to construct a more specialized apparatus to perform a similar sequence of procedures. In addition, the present disclosure is not described with reference to any particular programming language and any one in use in such computer systems can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications can be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, engines, modules, and so on have been described with respect to interactions between several components and/or blocks. It can be appreciated that such systems, engines, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

The methods and illustrative examples described herein are not inherently related to any particular computer or other apparatus. Various general purpose systems can be used in accordance with the teachings described herein, or it can prove convenient to construct more specialized apparatus to perform method 500 and/or each of its individual functions, routines, subroutines, or operations. Examples of the structure for a variety of these systems are set forth in the description above. The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

identifying, by at least one hardware processor of a first party host system, a plurality of third-party service providers that are authorized by a user to access user data;

continuously analyzing, by the at least one hardware processor of the first party host system, handling of user data by each of the plurality of third-party service providers, wherein the continuously analyzing comprises analyzing outbound application programming interface (API) calls that require access to the user data by reviewing log data associated with the outbound API calls to determine which of the plurality of third-party service providers require access to what user data;

determining, by the at least one hardware processor of the first party host system, a data privacy score for each of the plurality of third-party service providers based on one or more privacy risk factors corresponding to handling of user data by a respective third-party service provider;

associating the data privacy score with the respective third-party service provider, wherein the data privacy score is indicative of a level of protection and privacy of the respective third-party service provider maintains with respect to the handling of the user data; and providing, by the at least one hardware processor of the first party host system and for presentation on a client device associated with the user, a user interface (UI) displaying at least the data privacy score associated with the respective third-party service provider, the UI further comprising a data flow map that illustrates at least one of: what user data is being shared with one or more of the plurality of third-party service providers, with which of the plurality of third-party service providers the user data is being shared, or with what other entities the plurality of third-party service providers share the user data.

2. The method of claim 1, wherein the one or more privacy risk factors comprise one or more of data protection analysis, legal document analysis, third-party service provider notices, an allowlist, a denylist, application programming interface (API) analysis, application log analysis, user privacy preferences, or threat intelligence analysis.

3. The method of claim 1, further comprising:

determining that the data privacy score associated with the respective third-party service provider is lower than a threshold data privacy score; and providing an indication for the user to cease sharing the data with the respective third-party service provider.

4. The method of claim 1, further comprising:

combining data privacy scores of the plurality of third-party service providers to determine an overall data privacy score associated with the user.

5. The method of claim 1, wherein the determining the data privacy score for each of the plurality of third-party service providers based on one or more privacy risk factors comprises:

providing documentation associated with the respective third-party service provider as input to a machine learning model, wherein the machine learning model is trained to predict, based on a given textual input, data privacy policies associated with the given textual input;

obtaining a plurality of outputs from the machine learning model, wherein the plurality of outputs indicate one or more passages within the documentation associated with the data privacy policies of the respective third-party service provider; and analyzing the one or more passages to determine the data privacy score.

6. The method of claim 1, further comprising modifying the data privacy score responsive to determining that terms and conditions governing sharing of data between the user and the respective third-party service provider have expired.

7. The method of claim 1, further comprising:

determining that the data associated with the user has been compromised in a privacy breach; and transmitting a notification to the client device associated with the user, wherein the notification indicates that the data associated with the user has been compromised.

8. The method of claim 1, wherein the UI further displays information to request revocation of authorization of the plurality of third-party service providers to access the data associated with the user.

9. A first party host system comprising:

a memory device; and at least one hardware processor coupled to the memory device, the at least one hardware processor to perform operations comprising:

identifying a plurality of third-party service providers that are authorized by a user to access user data;

continuously analyzing handling of user data by each of the plurality of third-party service providers, wherein the continuously analyzing comprises analyzing outbound application programming interface (API) calls that require access to the user data by reviewing log data associated with the outbound API calls to determine which of the plurality of third-party service providers require access to what user data;

determining a data privacy score for each of the plurality of third-party service providers based on one or more privacy risk factors corresponding to handling of user data by a respective third-party service provider;

associating the data privacy score with the respective third-party service provider, wherein the data privacy score is indicative of a level of protection and privacy of the respective third-party service provider maintains with respect to the handling of the user data; and providing, for presentation on a client device associated with the user, a user interface (UI) displaying at least the data privacy score associated with the respective third-party service provider, the UI further comprising a data flow map that illustrates at least one of: what user data is being shared with one or more of the plurality of third-party service providers, with which of the plurality of third-party service providers the user data is being shared, or with what other entities the plurality of third-party service providers share the user data.

10. The system of claim 9, wherein the one or more privacy risk factors comprise one or more of data protection analysis, legal document analysis, third-party service provider notices, an allowlist, a denylist, application programming interface (API) analysis, application log analysis, user privacy preferences, or threat intelligence analysis.

11. The system of claim 9, the operations further comprising, responsive to determining that the data privacy score does not satisfy a threshold condition, providing, for presentation on the client device associated with the user, the user interface (UI) displaying an indication for the user to cease sharing the data with the respective third-party service provider.

12. The system of claim 9, the operations further comprising:

determining a second data privacy score for another third-party service provider authorized by the user to access the data associated with the user; and combining the data privacy score and the second data privacy score to determine an overall data privacy score associated with the user.

13. The system of claim 9, wherein the determining the data privacy score based on one or more privacy risk factors comprises:

providing documentation associated with the respective third-party service provider as input to a machine learning model, wherein the machine learning model is trained to predict, based on a given textual input, data privacy policies associated with the given textual input;

obtaining a plurality of outputs from the machine learning model, wherein the plurality of outputs indicate one or more passages within the documentation associated with the data privacy policies of the respective third-party service provider; and analyzing the one or more passages to determine the first data privacy score.

14. The system of claim 9, the operations further comprising modifying the data privacy score responsive to determining that terms and conditions governing sharing of data between the user and the respective third-party service provider have expired.

15. The system of claim 9, the operations further comprising:

determining that the data associated with the user has been compromised in a privacy breach; and transmitting a notification to the client device associated with the user, wherein the notification indicates that the data associated with the user has been compromised.

16. The system of claim 9, wherein the UI further displays information to request revocation of authorization of the respective third-party service provider to access the data associated with the user.

17. A non-transitory computer-readable storage medium comprising instructions for a server that, when executed by at least one hardware processor of a first party host system, cause the at least one hardware processor of a first party host system to perform operations comprising:

identifying a plurality of third-party service providers that is authorized by a user to access user data;

continuously analyzing handling of user data by each of the plurality of third-party service providers, wherein the continuously analyzing comprises analyzing outbound application programming interface (API) calls that require access to the user data by reviewing log data associated with the outbound API calls to determine which of the plurality of third-party service providers require access to what user data;

determining a data privacy score for each of the plurality of third-party service providers based on one or more privacy risk factors corresponding to handling of user data by a respective third-party service provider;

associating the data privacy score with the respective third-party service provider, wherein the data privacy score is indicative of a level of protection and privacy of the respective third-party service provider maintains with respect to the handling of the user data; and providing, for presentation on a client device associated with the user, a user interface (UI) displaying at least the data privacy score associated with the respective third-party service provider, the UI further comprising a data flow map that illustrates at least one of: what user data is being shared with one or more of the plurality of third-party service providers, with which of the plurality of third-party service providers the user data is being shared, or with what other entities the plurality of third-party service providers share the user data.

18. The non-transitory computer-readable storage medium of claim 17, wherein the one or more privacy risk factors comprise one or more of data protection analysis, legal document analysis, third-party service provider notices, an allowlist, a denylist, application programming interface (API) analysis, application log analysis, user privacy preferences, or threat intelligence analysis.

19. The non-transitory computer-readable storage medium of claim 17, the operations further comprising:

determining that the data privacy score associated with the respective third-party service provider is lower than a threshold data privacy score; and providing an indication for the user to cease sharing the data with the respective third-party service provider.

20. The non-transitory computer-readable storage medium of claim 17, the operations further comprising:

combining data privacy scores of the plurality of third-party service providers to determine an overall data privacy score associated with the user.

* * * * *